United States Patent [19]

Brown et al.

[11] Patent Number: 4,986,748
[45] Date of Patent: Jan. 22, 1991

[54] WIDE RANGE OXY-FUEL BURNER AND FURNACE OPERATION

[75] Inventors: John T. Brown, Corning, N.Y.; John Kosco, Belle Vernon, Pa.

[73] Assignee: Corning Incorporated, Corning, N.Y.

[21] Appl. No.: 451,258

[22] Filed: Dec. 15, 1989

[51] Int. Cl.⁵ ............................................. F23M 9/00
[52] U.S. Cl. ................................. 431/188; 239/424
[58] Field of Search ............................ 431/8, 187, 188; 239/424

[56] References Cited

U.S. PATENT DOCUMENTS

| | | | |
|---|---|---|---|
| 2,368,370 | 1/1945 | Maxon | 431/187 |
| 2,458,543 | 1/1949 | Urquhart | 158/110 |
| 2,518,025 | 8/1950 | Knight | 431/187 |
| 3,676,048 | 7/1972 | Sellors, Jr. et al. | 431/353 |
| 3,809,525 | 5/1974 | Wang et al. | 431/182 |
| 4,181,491 | 1/1980 | Hovis | 431/187 |
| 4,541,796 | 9/1985 | Anderson | 431/187 |
| 4,547,150 | 10/1985 | Vereecke | 431/63 |
| 4,690,635 | 9/1987 | Coppin | 431/187 |
| 4,842,509 | 6/1989 | Hasenack | 431/187 |

*Primary Examiner*—Carroll B. Dority
*Attorney, Agent, or Firm*—Burton R. Turner; Alfred L. Michaelsen

[57] ABSTRACT

An oxygen-fuel burner is disclosed which has a wide range of operation, allowing turn-down ratios of 5 to 1. In addition, the burner construction, which is not liquid cooled, maintains an acceptable burner tip temperature by having a tip which extends outwardly beyond the nose portion of the burner such that the oxygen flows columnarly therealong and functions to remove heat from the tip. In addition a delayed combustion is obtained by the gas discharge tip being axially spaced apart from the oxygen discharge orifice. The burner produces sufficient heat to permit the melting of batch materials to produce molten glass without the use of regenerators or recuperators.

11 Claims, 2 Drawing Sheets

WIDE RANGE OXY-FUEL BURNER AND FURNACE OPERATION

BACKGROUND OF THE INVENTION

This invention relates to oxy-fuel burners in general, and more specifically to oxy-gas burners which are not liquid cooled and which have a wide range of flow rates while maintaining safe burner tip temperatures.

The prior art is replete with burner assemblies of different configurations, however, most of such burners are designed for the lower temperature air-fuel combinations rather than the oxygen-fuel burner of the present invention.

U.S. Pat. No. 2,458,543 discloses a low viscosity air-gas burner having both primary and secondary supplies of air so as to provide a low velocity flame entering the furnace.

U.S. Pat. No. 3,676,048 discloses an air-gas burner particularly adapted for operation with exceptionally large quantities of excess air, wherein the air is supplied through a narrow gap at substantial velocity to cause a vacuum adjacent the gas supply tube and produce good mixing and efficient combustion.

U.S. Pat. No. 3,809,525 relates to a flat-flame burner utilizing an air-oil combustion mixture, wherein the burner tip is provided with helicoid passages for atomizing fuel oil droplets and mixing with eddying secondary air escaping adajcent the tip.

U.S. Pat. No. 4,181,491 relates to a method and apparatus for heating a furnace chamber utilizing an air-gas burner controlled in substantially stoichiometric ratio. The metallurgical furnace includes recuperators for preheating the air delivered to the burners, in the manner similar to the use of regenerators in glass melting furnaces.

U.S. Pat. No. 4,690,635 relates to a high temperature oxy-gas burner assembly wherein the gas conduit tip has a frusto-conical portion forming a knife edge for briefly delaying combustion, which tip is surrounded by a plurality of oxygen emitting holes disposed in a circular array or an annular shaped oxygen emitting orifice, or both.

In order to overcome the problems and complexities with the above noted burner assemblies of the prior art, it is an object of the present invention to provide an oxy-fuel burner having a wide range of flow rates and which maintains an acceptably cool body tip temperature, even at relatively low flow rates, without the use of liquid cooling.

Operationally, the improved structure of the present invention produces an increased capacity which provides a longer and smaller diameter high temperature flame or envelope of intense heat which can be precisely placed within a furnace structure to produce desired thermal conditions. Further, the utilization of such oxy-fuel burners in a conventional glass melting furnace, burning a combination of oxygen and gas or oil, can produce sufficient heat to eliminate the need for regenerators conventionally associated with such furnaces.

SUMMARY OF THE INVENTION

In its simplest form, the present invention sets forth a new concept in oxygen-fuel burner assemblies which have particular use in glass and metallurgical furnaces. When oxygen is utilized to support combustion rather than standard air, the flame temperatures produced are extremely high compared to those burners merely using air. Accordingly, turn down ratios were materially limited with prior art oxy-fuel burners, since when the flow rate was reduced, the accompanying cooling effect of the fuel and air blowing passed the burner tip was also reduced, which resulted in the tip reaching unsafe temperatures in the neighborhood of 300° C. or more, resulting in the oxidation or distortion of the tip and burner body. In the present construction, a burner tip is centered within, and not only projects through but extends outwardly from, a central orifice formed in a nose piece of the burner assembly, such that there is a delayed combustion between the gas supplied through the burner tip and the oxygen supplied through the central orifice of the nose piece surrounding the tip, thereby lowering the burner tip temperature to satisfactory levels.

DESCRIPTION OF THE PREFERRED EMBODIMENTS

The burner unit of the present invention is particularly characterized by a fuel conduit positioned within a housing which has an end portion provided with a central opening such that a burner tip formed on the fuel conduit extends centrally through such opening and projects outwardly therebeyond. The housing forms a chamber about the fuel conduit for supplying oxygen to an orifice formed in the end portion concentrically about the axial passageway formed in the extended burner tip. Thus, the actual flame produced by the burner is delayed a short distance outwardly from the burner tip, wherein the oxygen and fuel are combined producing a delayed combustion, thus reducing the temperature of the burner tip.

Figure 1:
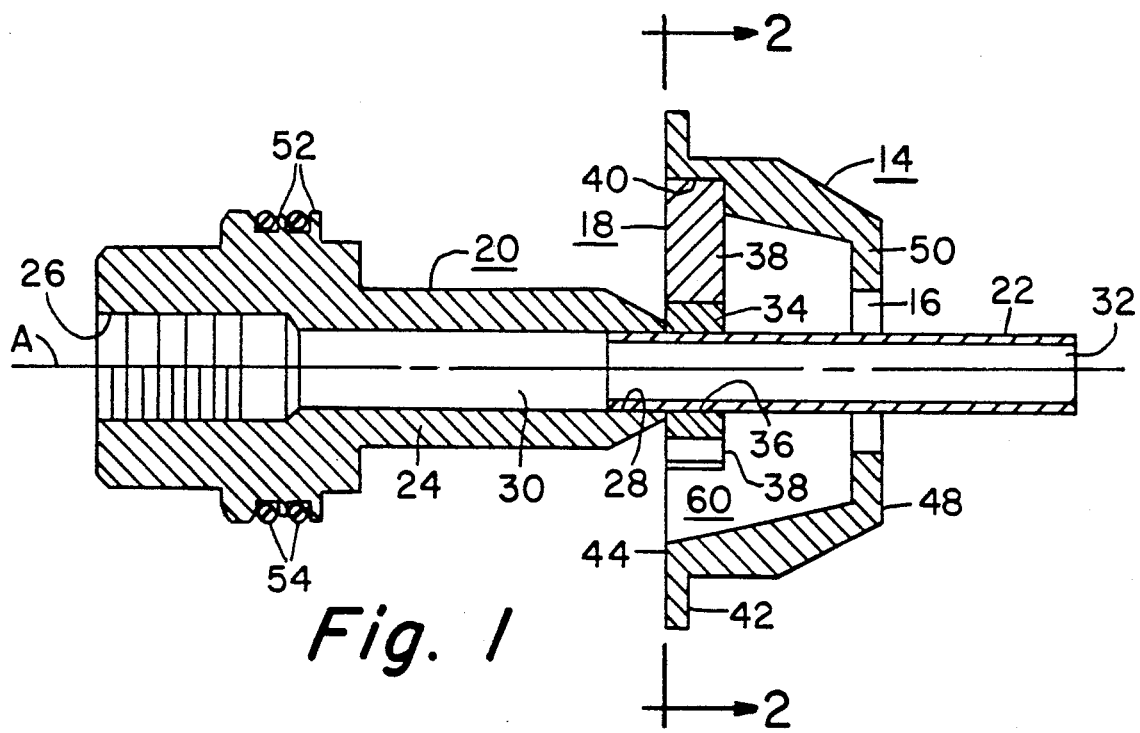
FIG. 1 is a cross-sectional view of a gas-oxygen burner assembly including a nose portion of a housing forming an overall part of the burner.
Figure 3:
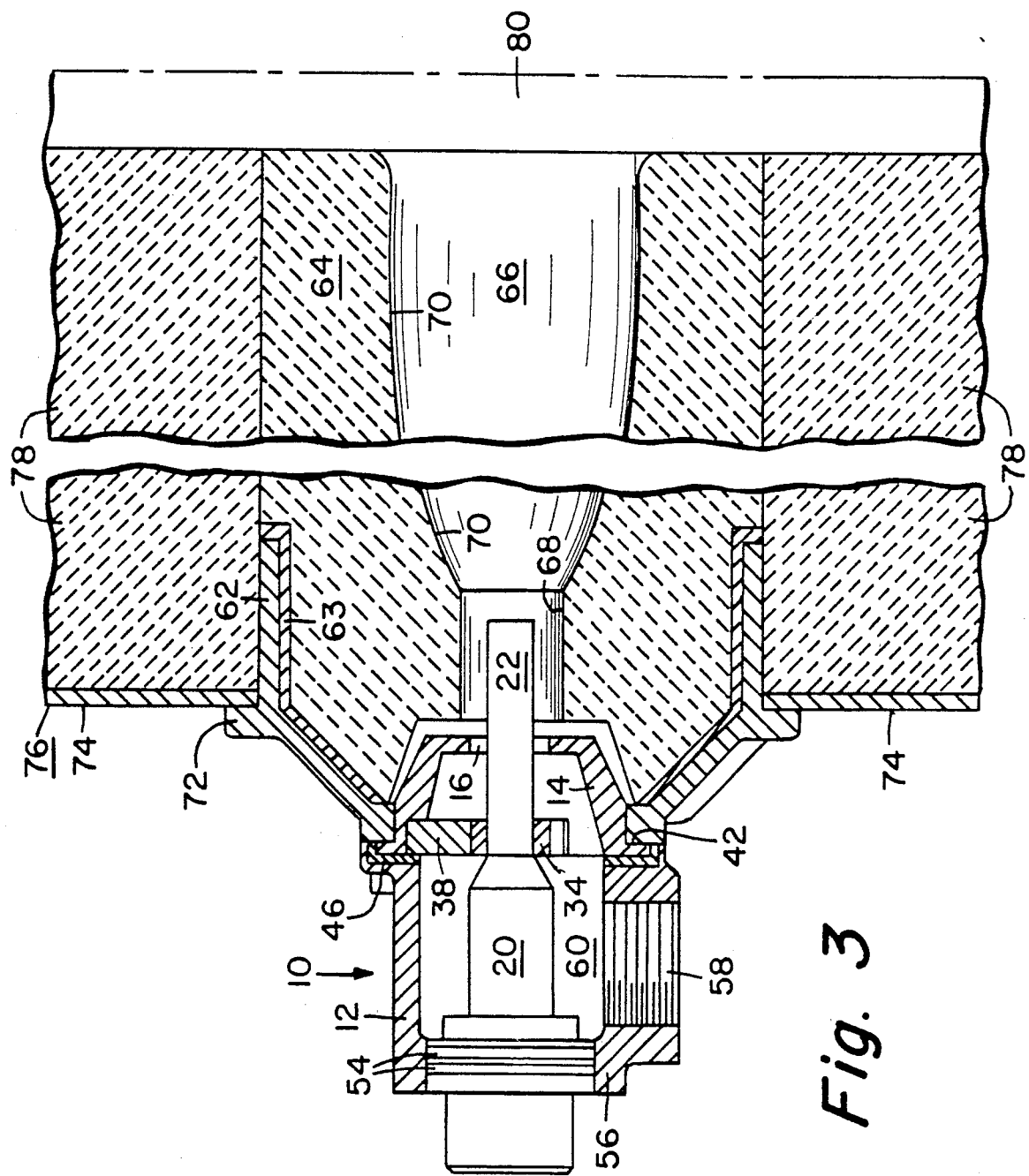
FIG. 3 is an elevational view partially in section of a complete burner unit embodying the present invention associated with a burner block and mounted within the sidewall of a furnace.

As shown in FIG. 3, the complete burner unit or assembly 10 of the present invention includes a housing 12 having a nose portion or nose piece 14 provided with a central discharge orifice or annular opening 16. In addition, as shown in FIG. 1, the nose portion 14 of the housing 12 has a centering ring assembly or spider 18 secured to an inlet end 44 thereof. A fuel or gas inlet assembly 20 is shown within the housing 12 with a burner tip portion 22 positioned by the centering ring 18 to extend centrally outwardly through the central annular opening 16 of the nose portion 14.

Figure 2:
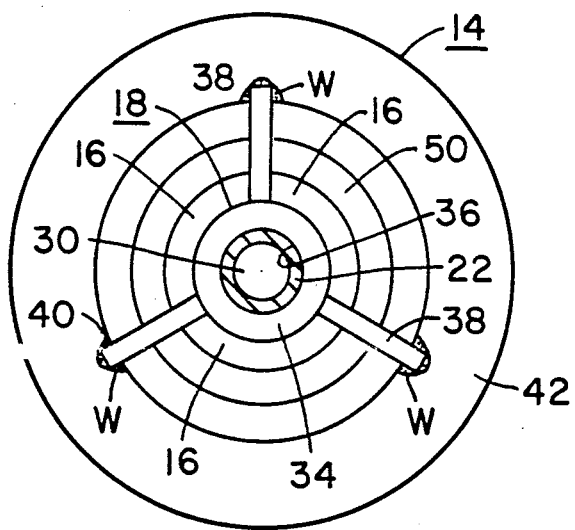
FIG. 2 is a view of the nose portion and centering spider taken along line 2—2 of FIG. 1.

Referring now also to FIGS. 1 and 2, the fuel inlet assembly 20 is shown comprising a fuel-gas conduit 24 having an inlet connector end 26 for receiving a suitable supply of fuel such as gas. An outlet end is shown receiving an inlet end of the burner tip portion 22. Although the tip portion 22 may be welded to the gas conduit 24, or they may be formed as one integral unit, it is desirable to have the burner tip portion easily removable from the gas conduit 24, such as by the use of screw threads, for reasons set forth hereinafter. The fuel inlet assembly 20, including the gas conduit 24 and burner tip portion 22, provides a continuous central fuel-gas conduit channel 30 from inlet connector end 26 to the outlet end 32 of the burner tip 22.

The centering ring assembly 18 is in the form of a spider, having a central hub 34 with a precision bore 36 formed therethrough, and a plurality of arms 38 which are welded at W in predetermined recess portions 40 of the nose piece 14 to accurately position and retain the hub portion centrally of the central annular opening 16 of nose piece 14. The arms 38 may be suitably welded to the central hub 34, so that the bore 36 is centered on the axial center of the nose piece 14 and the annular opening 16.

The nose piece 14 is provided with a mounting flange 42 adjacent its inlet end 44 which is suitably secured to the housing 12 and sealed by means of a gasket 46. The outlet end 48 of the nose piece 14 is provided with a radially inwardly extending flange portion 50 which defines the extent of the central annular opening 16, and which in turn, as set forth hereinafter, defines the oxygen outlet for the burner 10.

As shown particularly in FIGS. 1 and 3, the fuel inlet assembly 20 is positioned within the housing 12 with the burner tip portion 22 extending through the precision bore 36 of the centering ring 18, such that the tip 22 is axially centered within the central annular opening 16 and coaxial therewith. The gas conduit 24 is shown being provided with flange portions 52 having one or more o-rings 54 positioned therewithin (FIG. 1) for sealing the gas inlet assembly 20 with an outer lip portion 56 of the housing 12. An oxygen inlet 58 is provided within the housing 12 and communicates with an oxygen supply chamber or manifold 60 which surrounds the fuel inlet assembly 20 including the fuel-gas conduit 24 positioned within the housing 12 and the burner tip portion 22 extending through the nose piece 14.

The housing 12 is shown being connected to a retainer or support block holder 62 having a refractory burner block 64, such as stabilized zirconia, retained thereby with a suitable cement 63. The burner block 64 is provided with a central bore or combustion chamber 66 having a cylindrical inlet portion 68 for receiving the burner tip 22 and an expanded or flared flame channel portion 70. The retainer or support block holder 62 has a flange portion 72 for attachment to a furnace wall 74 of a furnace 76. The furnace is shown having conventional refractory block material 78 insulating the furnace wall 74 from the melting chamber 80.

As shown in FIG. 1, the axis A of the fuel-gas inlet assembly 20, and particularly the burner tip portion 22, is coincident with the axis of the precision bore 36 and the axis of the central annular opening 16. That is, the centering ring or spider 18 is so positioned within the nose portion 14 of the housing 12 so that the burner tip portion is precisely centered within the annular opening 16, so that the flow of oxygen about the burner tip 22 is uniform as it reaches the tip outlet end 32.

In operation, a suitable fuel such as gas is supplied to the inlet connector end 26 of the gas conduit 24 and flows along continuous central gas conduit channel 30 through the burner tip portion 22 and is expelled out of the outlet end 32. Simultaneously, oxygen is supplied to the oxygen inlet 58 and flows through chamber or manifold 60 outwardly through central annular opening 16 uniformly about burner tip 22 within the cylindrical inlet portion 68 of the combustion chamber 66. The gas and oxygen flows unite and produce a delayed combustion outwardly past the outlet end 32 of burner tip 22, thereby resulting in a reduced burner tip temperature. Further, since commercially available oxygen is substantially pure and does not contain the 78% nitrogen which is in air, the production of undesirable and hazardous $NO_x$ materials is virtually eliminated with the use of the present oxygen-fuel burner. In addition, the sensible heat capacity of the oxygen flowing past the burner tip 22 functions in removing heat from the non-water cooled burner, of this invention, to maintain acceptable tip temperatures.

The present construction provides easy variability in the design of the desired gas-oxygen flows. That is, since the gas inlet assembly 20 can easily be slid into and out of housing 12 and centering ring 18, the variation in the openings, 32 for the flow of gas from exit end 32, and opening 16 for the flow of oxygen from chamber 60, can be varied, merely by varying the inside diameter and outside diameter of the burner tip portion 22. That is, by merely changing the burner tip portion 22, such as by removably threading a new burner tip within the outlet end 28 of gas conduit 24, the outlet areas of the gas and oxygen ports can be appropriately changed as desired. A decreased I.D. of the burner tip portion 22 will decrease the cross-sectional area of the gas outlet end 32, whereas an increase in the O.D. will decrease the oxygen outlet area of the annular opening 16. Thus, the readily changeable screw-on burner orifice tips 22 function to accommodate varying thermal energy requirements. Further, it is important to realize that the central annular opening 16, which concentrically surrounds the axis of the burner tip portion, provides a uniform annulus of oxygen surrounding the gas inlet for providing a longer and smaller diameter high temperature flame or envelope than that which would be obtained from an equivalent sized larger burner.

In view of the fact that a gas-oxygen (oxy) burner produces a much hotter flame than an equivalent gas-air burner, it is important that the tip portion of the burner, which is not water cooled, be maintained at an acceptable temperature of about 300° C. or less. Preferably, the metallic portions of the burner are formed of alloy steels such as 310, 316, or 330 stainless steel or Hastaloy. In the present invention, the extended burner tip 22, which may be varied in length for cooling, is not only cooled by the flow of oxygen along its outer circumference, but also the extended construction into cylindrical chamber 68 lowers the velocity of the oxygen at the tip and provides for a delayed combustion off the end of the burner tip, thus lowering the flame temperature at the tip and materially reducing both the amount of heat retained by the burner tip from the flame, and the amount of fuel bound nitrogen converted $NO_x$.

The novel structure of the present invention actually provides two benefits with respect to the criteria of maintaining the burner structure within acceptable temperature limits without liquid cooling. That is, not only is the flame moved away from the nose portion 14 of the housing 12, by means of the extended burner tip portion 22 to thus protect the face of the burner from the high temperature of the flame; but also the flame is moved away from the outlet end 32 of the tip portion 22 by controlling the ratio of the velocity of fuel flow to the velocity of oxygen flow at the burner tip, which thereby protects the tip from the detrimental effects of the flame temperature. The structure of the burner tip portion 22, extending outwardly of the housing 12 into chamber 68, functions to protect the outlet face 48 of the housing 12 from the effects of the flame temperature, whereas it is both the structure of the burner 10 including the diameter of orifice 16, the inside and outside diameters of tip portion 22 and the chamber 68, combined with the ratio of the velocity of the fuel flow to the velocity of the oxygen flow which produces a delayed combustion of the flame away from the outlet end 32 of the tip portion 22, to thus protect the tip portion from the high temperature of the flame.

When designing a burner, a predetermined BTU/-hour is designated for its utilization, and accordingly the necessary flow rates of the gas and oxygen to produce such BTU/hour is determined. Using a fuel inlet assembly 20 with a burner tip portion 22 having a desired ID and OD, the size of the central annular opening or orifice 16 is determined so as to provide at least, about, a 4 to 1 ratio between the velocity of fuel flow from the assembly 20 and the velocity of oxygen flow through the orifice 16. That is, the velocity of the oxygen through the orifice 16 is set so as to be at least about $\frac{1}{4}$ of the velocity of the fuel through conduit 30 of the assembly 20. As noted particularly in FIG. 3, the orifice 16 has an internal diameter which is less than the diameter of the chamber 68, within which the burner tip portion projects. Thus, as the oxygen is discharged through orifice 16 into chamber 68, the velocity of the oxygen flow within the chamber 68 is slower than the velocity of the oxygen passing through the orifice 16 due to its expansion within the chamber 68. Accordingly, it is even possible to obtain a velocity ratio of fuel flow to oxygen flow of about 6 to 1 adjacent the outlet end 32 of the burner tip 22. The reduced velocity of the oxygen adjacent the outlet end of the burner tip 22 produces a delayed combustion, thus materially reducing the temperature of the tip portion from that obtained with prior art structures.

As an illustration, we have found that when the velocity ratio of fuel to oxygen is 1 to 1, such as normally utilized in the prior art, the nose portion 14 reached a temperature of 700° C., whereas a 2 to 1 ratio produced a temperature at the nose of 400° C., a 3 to 1 ratio produced a temperature at the nose of 300° C. and a 4 to 1 ratio lowered the nose portion temperature to about 200° C. Thus, it can be seen that the structure of the present invention, together with the proper control of the ratio of the velocity of fuel flow to the velocity of oxygen flow, produces a significant reduction in the temperature of the nose portion and burner tip, and thus results in a long lasting burner structure. Although the burner shown in U.S. Pat. No. 4,690,635 was designed to operate at a gas/oxy velocity ratio of 1.4 to 1, it has been operated up to a ratio of 3 to 1.

It should also be noted that when a flame is formed adjacent the nose of the burner housing, as was customary in the prior art structures, the flame radiates its heat in all directions, including such nose portions of the prior art structures, resulting in extremely high temperatures to the units. However, since the burner tip portion 22 of the present invention extends within the chamber 68, the chamber functions to reduce the radiation load from the flame, and shadows the heat coming back toward the nose portion 14, again materially reducing the temperature of the nose portion over that which the prior art structures were subjected to.

A small size gas-oxy burner similar in construction to that shown in U.S. Pat. No. 4,690,635 has an operational range of from about 70 to 1,000 SCFH (Standard Cubic Feet per Hour) of gas, with a turn down ratio of 3 to 1, and a scaled up larger model would have an operational range of from about 400 to 6,000 SCFH with the same turn down ratio. With the present design, however, a similar small size oxy-gas burner will have a design flow of gas range from about 30 to 5,000 SCFH, but with a turn down ratio of 5 to 1 for any individually designed burner. In a like manner, a similar scaled up burner would have an upper gas flow of about 10,000 SCFH, with a turn down ratio of 5 to 1.

For illustrative purposes, a small oxy-gas burner was made embodying the present invention having a 316 stainless steel nose portion with a central annular opening of 1.2274 inches. A gas inlet assembly having a 330 stainless steel burner tip portion with an inside diameter (I.D.) of 0.380 inches and an outside diameter (O.D.) of 0.505 inches was positioned within an alloy steel housing with the tip slid within the centering ring retained by the nose portion. The tip was accurately centered within the central annular opening in the nose portion having a diameter of 1.2274 inches so that oxygen could flow uniformly along the outer circumference of the burner tip. The gas inlet assembly provided a maximum gas flow of 1,700 SCFH with a burner velocity of 600 feet per second, providing a gas/oxy velocity ratio of 4.19 to 1.

A similar small burner made in accordance with the present invention also utilized a 316 stainless steel nose portion and a 330 stainless steel burner tip positioned within an alloy steel housing. The central annular opening in the nose portion had a diameter of 1.3122 inches, whereas the burner tip portion had an I.D. of 0.412 inches and an O.D. of 0.537 inches. The maximum gas flow from the gas inlet assembly was 2,000 SCFH, and the maximum burner velocity was 600 feet per second, with a gas/oxy velocity ratio of 4.08 to 1. In both examples, the centering ring or spider 18 perfectly centered the burner tip portion 22 within the central annular opening 16 so that the axis of the burner tip portion and the annular opening were concentric.

In addition, the burner tip portion 22 extended approximately 1¼" beyond the outlet end 48 of the nose piece 14 and into the cylindrical inlet portion 68 of the combustion chamber 66. In operation, such burners have maintained a tip temperature of less than 300° C. without relying upon any liquid cooling. Oxygen was supplied via inlet 58 to supply chamber or manifold 60 wherein it was discharged through the orifice provided by central annular opening 16 about the burner tip portion 22. Gas was supplied via inlet end 26 through continuous central gas conduit channel 30 and discharged from outlet end 32 to mix with the surrounding oxygen and provide a delayed combustion in the chamber 66. The central positioning of the tip 22 within the orifice or opening 16 is necessary in order to prevent flame distortion and resulting boil or burnout of the burner block.

When the burner is utilized to melt glass in a glass furnace, the increased precision in the placement of energy tends to create strong upward movement in the molten glass where it is desired to create rolls which increase the residence time of the glass. Such precisely placed molten glass rolls can in turn replace the refractory cross walls presently used to physically separate furnace sections in the batch melting and firing of gaseous inclusions. The cross-walls have a relatively short life of only several months, whereas a thermal cross-wall will be available as long as the furnace is in operation.

A further advantage of utilizing the burners of the present invention is the elimination of the need for regenerators or recuperators conventionally utilized in standard glass furnaces. That is, both pot furnaces and continuous tanks are usually provided with regenerators or recuperators which economize fuel by removing heat from the flue gas before it passes to the stack. Regenerator chambers, which operate in pairs, are filled with refractory checker work. While one chamber of a pair is being heated by passage of the hot products of combustion from the furnace, the other chamber is preheating air for combustion. At various intervals the flow of air and flue gas is reversed so that the heat stored in the one checkered chamber from the waste gases is delivered to the combustion air, while the bricks in the other, which have been cooled by the air, are again heated by the outgoing flue gas. Recuperators, whether refractory or metallic, offer the advantage over regenerators of continuous fire, by continuously flowing exhaust or combustion air through adjacent passages for heat transfer.

It is now economically possible and feasible to melt glass in a glass tank by utilizing banks of oxy-fuel burners of the present invention without utilizing a complex and costly regenerator or recuperator construction and procedures of the prior art. That is, we have found that when the thermal demands of the furnace to provide the required melting are four million BTU/hour or more, the normally utilized regenerators or recuperators may be eliminated and satisfactory melting obtained, merely by using oxygen-fuel burners of the present invention.

In addition, radiation heat losses are reduced by as much as 80% with the present invention by the elimination of the large ports required to supply and remove air when utilizing regenerators or recuperators. Since as much as 30% of the purchased energy is lost as radiation heat loss due to such large ports, about 75-80% of that 30% loss is avoided by the present oxy-fuel burner process, since the need for such large ports is eliminated.

Further, with gas-oxy burners, half as much purchased energy is used than with gas-air furnaces using regenerators or recuperators. In other words, by eliminating the thermal demands of nitrogen, which represent 80% of the sensible heat requirements of air, the heat released by the present oxy-gas burners is of such magnitude so as to provide the necessary heat to melt batch materials and provide molten glass of commercially acceptable homogeneous consistency, without the use of regenerators or recuperators.

Although the now preferred embodiments of the invention have been disclosed, it will be apparent to those skilled in the art that various changes and modifications may be made thereto, without departing from the spirit and scope of the invention as set forth in the appended claims.

We claim:
1. An oxygen-fuel burner assembly which comprises:
   a burner housing having a nose portion.
   a central annular opening formed through said nose portion,
   a fuel inlet assembly positioned within said housing and having a burner tip portion extending through said central annular opening of said nose portion,
   means for axially centering said burner tip portion within said central annular opening,
   means for supplying fuel through said fuel inlet assembly to an outlet end of said burner tip portion,
   means for supplying oxygen to said burner housing for flow about said fuel inlet assembly within a chamber formed between said housing and said fuel inlet assembly and for discharge through said annular opening along the outer circumference of said burner tip portion extending through said nose portion for delayed combustion with the fuel adjacent said outlet end, and
   said means for axially centering said burner tip portion including a centering spider member, said spider member having a central hub with a precision bore axially coincident with the axis of said central annular opening for slidably receiving and positioning said burner tip portion centrally of said central annular opening.

2. A burner assembly as defined in claim 1 wherein said spider member further includes a plurality of arms extending between said central hub and said nose portion for accurately positioning the axis of said bore within said central hub coaxially with the axis of said central annular opening.

3. An oxygen-gas burner assembly which comprises:
   a burner housing having a nose portion terminating in an outlet end,
   said nose portion having a central discharge orifice formed through said outlet end,
   a gas inlet assembly positioned within said housing,
   an oxygen supply chamber formed within said housing surrounding said gas inlet assembly,
   centering ring means secured to said housing and having a central bore in substantial axial alignment with said discharge orifice for centering at least a portion of said gas inlet assembly within said discharge orifice,
   said gas inlet assembly including a burner tip portion slidably received within said central bore of said centering ring means so as to be substantially coaxially aligned with the axis of said central discharge orifice,
   said burner tip extending centrally through said central discharge orifice and having an outlet end which extends outwardly beyond the outlet end of said nose portion,
   means for supplying gas to said gas inlet assembly for discharge through the outlet end of said burner tip portion,
   and means for supplying oxygen to said oxygen supply chamber for discharge through said central discharge orifice and along said burner tip portion extending outwardly beyond the outlet end of said nose portion for delayed combustion with said gas adjacent the outlet end of said burner tip portion.

4. A burner assembly as defined in claim 3 wherein said centering ring means includes a hub portion provided with said central bore, said hub portion is mounted within said housing so that the axis of said central bore and the axis of said central discharge orifice are coaxial for centering said burner tip portion within said discharge orifice.

5. A burner assembly as defined in claim 3 wherein said gas inlet assembly includes a gas conduit and said burner tip portion, and said burner tip portion being removably secured to said gas conduit so as to readily change such tip portions to accommodate varying thermal energy requirements of the burner.

6. A burner assembly as defined in claim 3 wherein said housing has a support block holder secured thereto retaining a refractory burner block, said refractory burner block having a central combustion chamber formed therein, and said burner tip portion extending into said central combustion chamber.

7. An oxygen-fuel burner assembly which comprises:
a burner housing having a nose portion.
a central annular opening formed through said nose portion,
a fuel inlet assembly positioned within said housing and having a burner tip portion extending through said central annular opening of said nose portion,
means for axially centering said burner tip portion within said central annular opening,
means for supplying fuel through said fuel inlet assembly to an outlet end of said burner tip portion,
means for supplying oxygen to said burner housing for flow about said fuel inlet assembly within a chamber formed between said housing and said fuel inlet assembly and for discharge through said annular opening along the outer circumference of said burner tip portion extending through said nose portion for delayed combustion with the fuel adjacent said outlet end, and
said axial centering means including a centering ring assembly fixedly secured to said nose portion and having a bore extending therethrough axially coincident with the axis of said central annular opening so as to slidably receive said burner tip portion and accurately position said burner tip portion coaxially through said annular opening.

8. An oxygen-fuel burner assembly which comprises:
a burner housing having a nose portion,
a central annular opening formed through said nose portion,
a fuel inlet assembly positioned within said housing and having a burner tip portion extending through and outwardly beyond said central annular opening of said nose portion,
spider means spaced from said central annular opening for axially centering said burner tip portion within said central annular opening in spaced-apart relationship with said nose portion forming a discharge annulus within said central annular opening between said burner tip portion and said nose portion,
said spider means having a central hub with a bore formed therethrough and a plurality of arms extending radially-outwardly from said central hub and secured to said housing, said arms accurately positioning said hub so that said bore is centered on the axial center of said central annular opening formed through said nose portion, and said bore slidably receiving said burner tip for centering the same;
means for supplying fuel through said fuel inlet assembly to an outlet end of said burner tip portion, and
means for supplying oxygen to said burner housing for flow about said fuel inlet assembly within a chamber formed between said housing and said fuel inlet assembly and through said spider means within such chamber, and for discharge through said discharge annulus along the outer circumference of said burner tip portion extending through and outwardly beyond said nose portion for delayed combustion with the fuel adjacent said outlet end.

9. A burner assembly as defined in claim 8 wherein said fuel inlet assembly includes a fuel conduit member and said burner tip portion, and said burner tip portion is screw-threadably removably secured to said fuel conduit member so as to facilitate the exchange of burner tips, within the fuel inlet assembly, having varying inside the outside diameters as desired to accommodate varying thermal energy requirements.

10. An oxygen-fuel burner assembly which comprises:
a burner housing having a nose portion,
a central annular opening formed through said nose portion,
a fuel inlet assembly positioned within said housing and having a burner tip portion extending through and outwardly beyond said central annular opening of said nose portion,
means spaced from said central annular opening for axially centering said burner tip portion within said central annular opening in spaced-apart relationship with said nose portion forming a discharge annulus within said central annular opening between said burner tip portion and said nose portion,
means for supplying fuel through said fuel inlet assembly to an outlet end of said burner tip portion,
means for supplying oxygen to said burner housing for flow about said fuel inlet assembly within a chamber formed between said housing and said fuel inlet assembly and for discharge through said discharge annulus along the outer circumference of said burner tip portion extending through and outwardly beyond said nose portion for delayed combustion with the fuel adjacent said outlet end,
said fuel inlet assembly being positioned within said burner housing with said burner tip portion removably slidably received within said axial centering means,
an oxygen supply chamber formed within said housing about said fuel inlet assembly,
an oxygen inlet formed through said housing and communicating with said oxygen supply chamber, and
said oxygen supply chamber exiting said housing through said discharge annulus portion of said central annular opening so as to supply oxygen along said burner tip, outwardly beyond said nose portion, to the outlet end thereof so as to provide delayed combustion with the fuel supplied through said fuel inlet assembly.

11. A burner assembly as defined in claim 3 wherein said burner tip portion includes means for screw-threadably mounting said burner tip portion in said burner housing for facilitating the removal of the burner tip portion and the substitution of another burner tip portion.

* * * * *